United States Patent

[11] 3,576,147

[72] Inventor  Charles E. Kerr, Jr.
              Hillsboro, Oreg.
[21] Appl. No. 806,541
[22] Filed     Mar. 12, 1969
[45] Patented  Apr. 27, 1971
[73] Assignee  Eltec, Inc.
              Lake Oswego, Oreg.

[54] BELT CUTTER
    5 Claims, 2 Drawing Figs.

[52] U.S. Cl. .................................................. 83/187,
         83/430, 83/433, 83/441, 83/482, 83/506
[51] Int. Cl. .................................................. B26d 1/22
[50] Field of Search .................................... 83/430,
     187, 482, 506, 505, 564, 446, 433, 504, 582, 925,
                                                    438, 441

[56]            References Cited
              UNITED STATES PATENTS
    94,358   8/1869  Snooner ...................... 83/187X 1,783,869  12/1930  Allen ............................ 83/482
    2,664,950   1/1954  Morgan et al ................. 83/482
    3,344,718  10/1967  Schollard ..................... 83/564X
    3,435,716   4/1969  Sjostrand ..................... 83/564X Primary Examiner—James M. Meister
Attorney—Kolisch & Hartwell ABSTRACT: Belt-cutting apparatus including a pair of disc members used in cutting positioned one above the other and journaled on a stand. The stand includes an arm mounting the upper member pivotally mounted on a pedestal that forms a lower part of the stand. The arm is spring biased downwardly to force the two members together for cutting purposes. A shaft extends along the arm, and the upper member is connected to one end of this shaft. A handle is joined to an exposed opposite end of the shaft and is used to turn the shaft and the member connected to it. The handle also is employable to swing the arm upwardly to separate the members. A material guide for positioning the inner edge of a belt being cut is adjustably mounted on the pivoted arm.

INVENTOR
CHARLES E. KERR, JR.
BY
Kolisch + Hartwell
ATTORNEYS

BELT CUTTER

This invention relates generally to apparatus for cutting a strip of material into narrower widths, and is more particularly concerned, in a specific embodiment of the invention, with apparatus that might be employed to cut continuous belts in this manner. Belts of this description, which may advantageously be cut into narrower strips, comprise endless abrasive belts used in smoothing and polishing operations, and the invention therefore, embraces certain features particularly adapting the apparatus for cutting such belts.

Abrasive belts are procured most economically if bought in relatively wide widths. Many machines are designed, however, for a belt of narrow width, requiring the special ordering of a narrow width belt, or the cutting down to size of a wider belt. The first alternative increases the expense of the belt, and the cutting of a belt to a narrow width is difficult to perform with devices presently known.

Generally, an object of this invention is to provide improved apparatus for cutting belts, particularly adapted for use with continuous belts.

Another general object is to provide cutter apparatus for belts which can cut abrasive belts without experiencing excessive wear.

A further object is to provide such apparatus which can be used to cut abrasive belts where the abrasive material resides on the outer or inner face of the belt.

Yet another object is to provide cutter apparatus including novel means for determining the width of a strip cut from a belt.

An additional feature of the apparatus is the provision of a novel organization which is readily adapted to spread apart the means producing cutting to permit the insertion of an endless belt.

The apparatus contemplated is practical, yet relatively simple and thus easy to maintain and repair.

Other objects and advantages will become more fully apparent as the following description is read in conjunction with the accompanying drawings, wherein.

Figure 1:
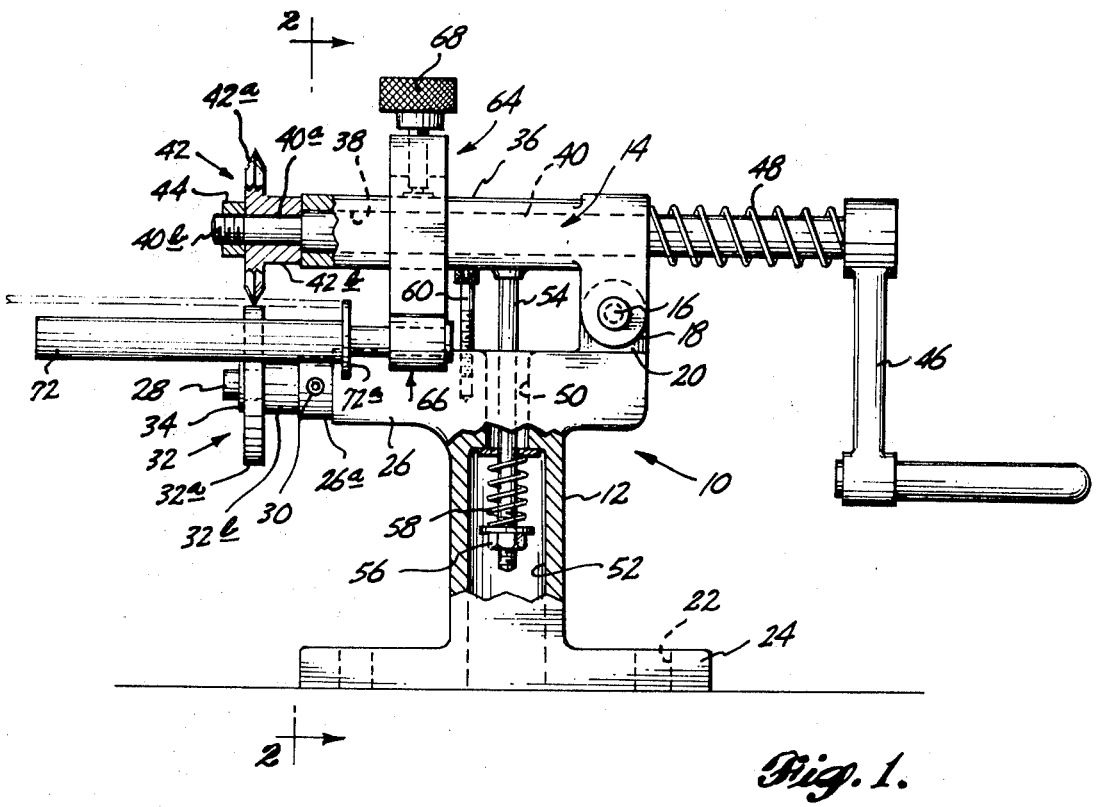
FIG. 1 is a side elevation illustrating apparatus as contemplated.

Referring now to the drawings, in the specific embodiment of the invention illustrated, the apparatus comprises what is referred to as a stand, designated generally at 10, formed by a bottom pedestal 12 and an upper portion 14. The two are interconnected by pivot pin or means 16, pivotally joining opposed legs including leg 18 that straddle a boss 20 in pedestal 12. The pivot axis afforded by the pin permits swinging of upper portion 14 upwardly from the position shown, about generally a horizontal axis.

The pedestal is adapted to be fastened to a table or other support, by means of fasteners inserted through bores 22 provided in a pad 24. Alternatively, of course, the stand could be temporarily clamped into place using a C-clamp or other device.

The pedestal further includes a horizontally extending lower arm or arm portion 26, terminating in a cylindrical boss 26a. A cylindrical shaft 28 is received within an internal bore provided in boss 26a, and is secured in place as by set screws 30. A disc-shaped anvil member, also referred to as a disc element or member used in cutting, shown at 32, is rotatably mounted on shaft 28. The member includes a disc 32a mounted by a cylindrical wall, and integral with this disc a hub 32b which serves to space the disc a short distance outwardly from boss 26a of the pedestal. Snap fitting 34 snapped onto the end of shaft 28 holds the anvil member in place. The construction described mounts the anvil member with the same permitted to rotate about its central axis, which axis extends along the length of arm portion 26 and is normal to the pivot axis provided by pin 22.

Upper portion 14 of the stand also includes an elongated arm portion 36 which substantially parallels lower arm portion 26. Extending along a length of arm portion 36 is a smooth-walled internal bore 38.

Mounted within bore 38, and extending along the length of the upper arm portion 36, is an elongated shaft 40 which is rotatable within the bore. The shaft, at its left end in FIG. 1, includes a section 40a of somewhat reduced diameter, and an externally threaded section 40b. The diameter of section 40a substantially corresponds to the diameter of shaft 28 mounting anvil member 32.

Another disc element used in cutting, more specifically, a disc-shaped cutter, is shown at 42. Such includes a disc 42a bounded by a double-beveled cutting edge, and an integral hub 42b. The cutter member is internally bored, whereby the same may be snugly fitted over section 40a of shaft 40. Nut 44 screwed onto threaded section 40b is tightened to draw hub 42b of the cutter member snugly up against the shoulder formed where section 40a joins with the larger diameter portion of shaft 40. Sufficient frictional contact is provided between the cutter member and the shaft to cause the cutter member to rotate with the shaft on turning of the shaft.

The shaft has an end opposite the end mounting the cutter member which protrudes beyond the opposite end of arm portion 36. Mounted on the extremity of this opposite end of arm portion 36. Mounted on the extremity of this opposite end of the shaft is a crank handle 46. A compression spring 48 encircles the shaft where it protrudes beyond the end of arm portion 36, with opposite ends bearing upon the crank handle and the end of the arm portion, respectively. Thus, the shaft 40 is biased in a direction causing the disc cutter member to be drawn up against the left end of arm 36.

The mounting described for the disc cutter member 42 permits the same to be rotated with turning of the handle with such rotation being about the center axis of the member and such center axis paralleling the axis of anvil member 32.

The pedestal in the stand is formed with a pair of passages 50, 52 extending upwardly through its interior, with lower passage 52 being somewhat bigger than the upper one. An elongated stud 54 suitably joined to upper arm portion 36 extends downwardly through the passages and has a nut 56 screwed onto its threaded lower end. A coil-compression spring 58 encircling a lower part of the stud and interposed between the nut and the shoulder formed where passage 52 meets passage 50 serves to bias stud 54 by urging it downwardly. In this way, upper arm portion 36 is biased downwardly, the spring restraining upward pivotal movement of arm portion 36 and separation of the two disc-type cutter elements.

An adjustable stop 60 may also be provided in the form of a screw screwed into the pedestal with an upper end adapted to contact the lower surface of arm portion 36 thus to define a lowered position for the arm. Ordinarily, the stop is adjusted so that the lowered position for the arm is defined with disc cutter 42 just contacting the anvil member.

Figure 2:
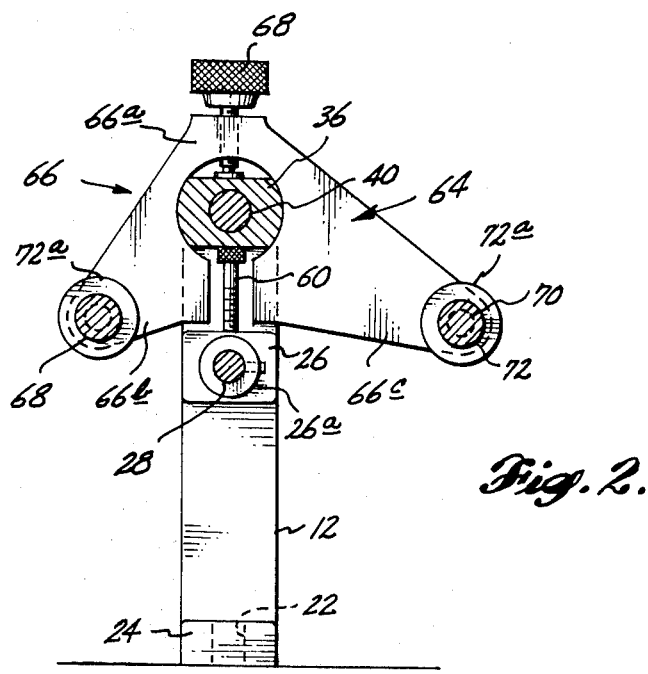
FIG. 2 is a cross-sectional view, taken along the line 2—2 in FIG. 1.

A material guide is shown at 64. Such includes (and referring to FIG. 2) an adjustable frame 66 including a central portion 66a which envelopes the upper arm portion and is shaped to be guided by the upper arm portion on the same being moved lengthwise thereon. A clamp screw 68 screwed into an accommodating internally threaded bore extending downwardly in central portion 66a is adapted to have its lower end brought into clamping engagement with the upper part of arm portion 36 with downward turning of the screw.

Further describing the material guide, legs 66b, 66c project radially outwardly from arm portion 36 and slightly below it. Suitably mounted on the lower extremities of each of these legs are rods 68, 70, each of which journals a flanged guide roller such as that shown at 72. Flanges 72a of the guide rollers define a plane for guiding the edge of a strip of material which is spaced axially from where the cut edge is produced, which is where the nip is defined between the beveled edge of disc cutter 42 and the cylindrical anvil edge of disc 32a.

It will be noted that by providing the pivot pin, the upper portion of stand 14, including arm portion 36, may be pivoted upwardly to separate the two disc-type elements used in cutting. This is resisted by spring 58 which is the spring which biases the members together for cutting purposes. With the turn handle positioned at a point remote from the pivot axis provided by pin 16, the turn handle and shaft 40 may be used as a lever arm to facilitate pivoting of the upper arm portion to separate members 32 and 42. With the members moved apart, an endless belt may be fitted over the guide rollers with an edge against the guide flanges 72a, and with the outer surface thereof lying under the disc cutter. The region of cutting which the apparatus will make then clearly is indicated, by noting where the cutter comes in contact with the belt. With lowering of upper part 14, the belt moves downwardly onto the anvil member, with disc cutter 42 being forced against the upper surface of the belt while the belt is supported on its lower surface by the anvil member.

Shaft 40 is journaled within bore 38, and it is important that any abrasive or grit material be prevented from traveling down the bore to introduce excessive wear. It is for this reason that spring 48 is included which functions to draw hub 42b up snugly against the end of arm 36.

While most abrasive belts have their abrasive deposits on their outer surfaces, in some special applications, the abrasive material is deposited on the inner surface of the belt. The apparatus contemplated permits interchanging of the position of members 32,42, by unscrewing nut 44 to permit removal of member 42, and by unsnapping fitting 34 to permit removal of member 32. The parts are then interchanged.

To change the width of the strip cut from a belt, the material guide is adjusted along the length of arm portion 36 after first loosening clamp screw 68.

The operation of the apparatus should be obvious. Thus, to cut a continuous belt, the width of the strip to be cut is first determined and the material guide positioned with respect to the disc cutter to produce the desired width. A run of the belt is then inserted between the members 32,42, after first separating the members by downward pushing on the turn handle. Turning of the turn handle rotates the member mounted on shaft 40, with the members 32,42, then making a cut which generally parallels the edge which rides against flanges 72a. A continuous belt may thus be cut to produce a continuous narrower strip, and to leaves a remaining piece which is also continuous, from which further strips can be cut.

The apparatus described is simple and reliable, and provides a practical answer to the problems involved in cutting strips from wide belts.

While a particular embodiment of the invention has been described, it should be understood that variations and modification are possible without departing from the inventive concepts embraced by the invention.

I claim:

1. Cutter apparatus for cutting strip material into narrower widths comprising:
    a stand,
    a disc cutter member and a radially spaced disc anvil member rotatably mounted on said stand, for rotation about their center axes which are disposed in substantially parallel relationship, the cutter and anvil members being positioned to define a nip through which material to be cut is fed,
    a material guide mounted on said stand, including means for guiding an edge of material being cut along a plane which is spaced axially from the cutter and anvil members, the mounting for said material guide on said stand accommodating movement for adjustment purposes in a direction paralleling the axes of said member,
    said stand including for at least one of said members an elongated arm that extends axially from the member with said member being mounted on an end of said arm, pivot means mounting the arm at a point remote from the member for pivotal movement about an axis extending transversely of the member's rotation axis thus to permit the arm to be swung to move the member away from the other member, and means connected to the arm restraining such swinging movement of said arm.

2. The cutter apparatus of claim 1, wherein one of said members is disposed above the other, the axes of said members are substantially horizontal, an elongated shaft with the axis thereof coinciding with the axis of the upper one of said members is mounted on said arm and said shaft extends the length of said arm, the upper one of said members is mounted on one end of said shaft adjacent one end of said arm, said shaft includes an opposite end which protrudes beyond the opposite end of said arm, a spring encircling said opposite end of the shaft biases the shaft to draw the upper one of said members against the said one end of said arm, and the stand further includes a pedestal beneath said arm, said pivot means connecting said arm to said pedestal.

3. Cutter apparatus comprising an elongated arm, a shaft journaled on the arm extending along the length thereof, a disc element used in cutting mounted on one end of the shaft adjacent one end of said arm, said shaft including an opposite exposed end which projects beyond the opposite end of said arm, a spring interposed between the arm and exposed end of the shaft biasing the shaft to draw the disc element toward the arm's said one end, another cooperating disc element used in putting disposed radially from the first-mentioned disc element and with the periphery thereof and the periphery of the first-mentioned element defining a nip through which material to be cut is fed, another arm mounting said other disc element, means movably mounting one arm on the other, and means resiliently drawing the two arms together.

4. The apparatus of claim 3, wherein said first-mentioned and said other arm are part of a stand, and are disposed with the first-mentioned arm above said other arm, and a handle is provided on the exposed end of said shaft for turning said shaft.

5. The apparatus of claim 4, wherein a material guide for guiding an edge of material being cut is adjustably mounted on said first-mentioned arm for movement along the length of the arm.